United States Patent
Ramsey

[11] 3,833,325
[45] Sept. 3, 1974

[54] BALANCED FLOW EXTRUSION HEAD
[76] Inventor: John C. Ramsey, 498 Island Way, Franklin Lakes, N.J. 07417
[22] Filed: Aug. 23, 1972
[21] Appl. No.: 283,059

[52] U.S. Cl. ............................. 425/113, 425/380
[51] Int. Cl. .............................................. B29f 3/10
[58] Field of Search ................... 425/113, 197, 380; 264/174

[56] References Cited
UNITED STATES PATENTS

| | | | |
|---|---|---|---|
| 2,560,778 | 7/1951 | Richardson et al. | 425/113 X |
| 2,760,230 | 8/1956 | Van Riper | 425/113 |
| 2,893,056 | 7/1956 | Henning | 425/113 |
| 2,943,352 | 7/1960 | Van Riper | 425/113 X |
| 3,404,432 | 10/1968 | White | 425/113 |
| 3,432,885 | 3/1969 | Zanini | 425/197 X |

FOREIGN PATENTS OR APPLICATIONS

| | | | |
|---|---|---|---|
| 1,203,657 | 4/1959 | France | 425/113 |
| 45-49418 | 12/1970 | Japan | 425/113 |

*Primary Examiner*—R. Spencer Annear
*Attorney, Agent, or Firm*—Alfred W. Vibber

[57] ABSTRACT

A plastic material extruding crosshead for uniformly sheathing a core passing forwardly therethrough. The crosshead has a main, circular cylindrical bore therein, and a centrally disposed elongated core guiding tube disposed within the bore coaxially thereof. An extruding die is mounted at the forward end of the bore; the bore and the central tubular member formed therebetween a sleeve-like chamber extending forwardly to the die. The apparatus includes mechanism for delivering plastic material under pressure in a sidewise direction to the rear end of the chamber, there being means at such rear end of the chamber for diverting the plastic material forwardly along the chamber as it is delivered therefrom from the material delivering mechanism. In accordance with the invention there are provided within the chamber means for creating a balanced flow of plastic material as it nears the rear face of the die and as it flows forwardly about the core being sheathed. Such means includes a first flow-constricting means which forces the plastic material to pass in a single stream longitudinally of the central tubular member in a zone remote from the plastic material delivering mechanism, a further means which divides such single stream of plastic material into a plurality of oppositely symmetrically disposed streams, and a further means which divides each of such two symmetrically disposed streams into a plurality of further streams. The resulting plurality of streams, which are similar and equally angularly spaced about the axis of the chamber, flow forwardly into an unbroken, completely annular forward portion of the chamber immediately to the rear of the extrusion die, where such four streams unite in order to flow uniformly about the core, and with the core pass outwardly through the passage in the extrusion die.

7 Claims, 5 Drawing Figures

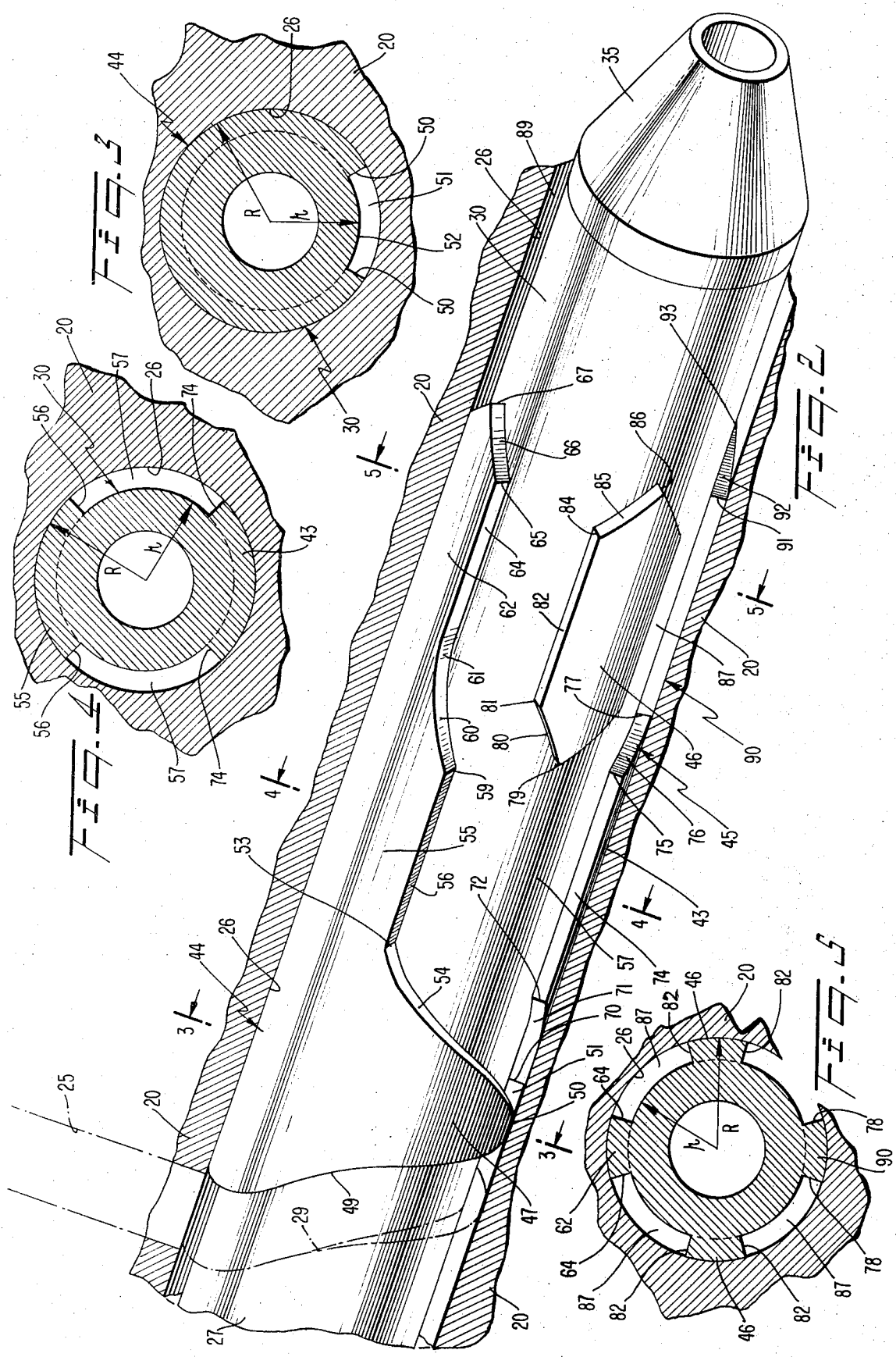

BALANCED FLOW EXTRUSION HEAD

This invention relates to an extrusion head for plastic material extruding apparatus, and more particularly relates to a head for extruding plastic material of continuous annular cross-section. In the preferred, illustrative embodiment, the crosshead continuously applies a sheath of uniform cross-section to a core passing through the crosshead.

In an extrusion head of the crosshead type wherein the material, such a cable core being sheathed, travels generally at right angles to the direction in which the plastic material is delivered under pressure to the extrusion head from the extruding machine, difficulty has been experienced in the delivering of plastic material about the core in a uniform manner. If such delivery of plastic material is not uniform, the die must be adjusted so that the passage therethrough is positioned eccentric of the core guider tube whereby in the final product the core is accurately centered in the sheath, and the sheath is of substantially uniform dimensions and properties completely about its angular extent. It is difficult to arrive at the correct eccentric adjustment of the die, however, and such adjustment must be periodically checked and changed when necessary in order to compensate for variations in the differences in rates of flow of plastic material in various zones spaced angularly around the axis of the passage through the die.

The problem of non-uniform flow of plastic material through the die in crossheads has been solved to increasing extents by constructions in accordance with Van Riper U.S. Pat. Nos. 2,943,352 and 3,206,802. The present invention may be said to be an improvement upon such two Van Riper patents. In accordance with the present invention, not only is the plastic material forced to flow primarily initially to the zone of the chamber in the head which lies remote from the plastic material delivering mechanism, but the plastic material is forced to flow forwardly in a single zone in the rear end of such chamber. Instead of then permitting the plastic material diverted by the inclined bounding surface at the rear of the chamber, in effect, to find its own way as it travels through the chamber, the crosshead of the present invention includes means for positively dividing the single stream of plastic material into a plurality of symmetrically disposed similar streams as it travels forwardly, and further means for dividing each of such streams into a plurality of further streams, again similar and symmetrically disposed about the longitudinal axis of the chamber. A plurality of similar equally angularly spaced streams of plastic material thus flow together forwardly beyond the stream dividing and directing means, such plurality of streams flowing together to coalesce in an annular forward portion of the chamber so as to form a completely annular sheath of uniform wall thickness about the core as the core and sheath travel together through the passage in the extrusion die. The stream-dividing and controlling means in the chamber are of such configuration and axial length as substantially to remove all components of motion therefrom except that directed in a substantially forward direction.

The head of the present invention, in the preferred illustrative example presented herein, is easy to make, and is easily assembled and disassembled. The flow-controlling formations in the chamber of the head are preferably made in the form of lands on the outer surface of the central, core guiding tube, such lands being of a radial dimension such as accurately to fit within the main bore in the head and thus to form dams between such bore and the central tube. By use of the present invention, the same extrusion head can be employed for extruding a large variety of different plastic materials. With a crosshead provided with the flow-controlling central guider tube in accordance with the invention, the core being sheathed is substantially completely self-centering, a result which has not been possible before the present invention.

The above and further objects and novel features of the invention will more fully appear from the following description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views:

FIG. 2 is a fragmentary view in perspective showing the forward, delivery end of the core guider tube of FIG. 1, such guider tube being shown positioned in an axially sectioned portion of the body of the crosshead;

FIG. 3 is a view in transverse section through the apparatus shown in FIG. 2, the section being taken along the line 3—3 of FIG. 2;

FIG. 4 is a view in transverse section through the apparatus of FIG. 2, the section being taken along the line 4—4 of FIG. 2; and FIG. 5 is a view in transverse section taken through the apparatus shown in FIG. 2, the section being taken along the line 5—5 of FIG. 2.

Figure 1:
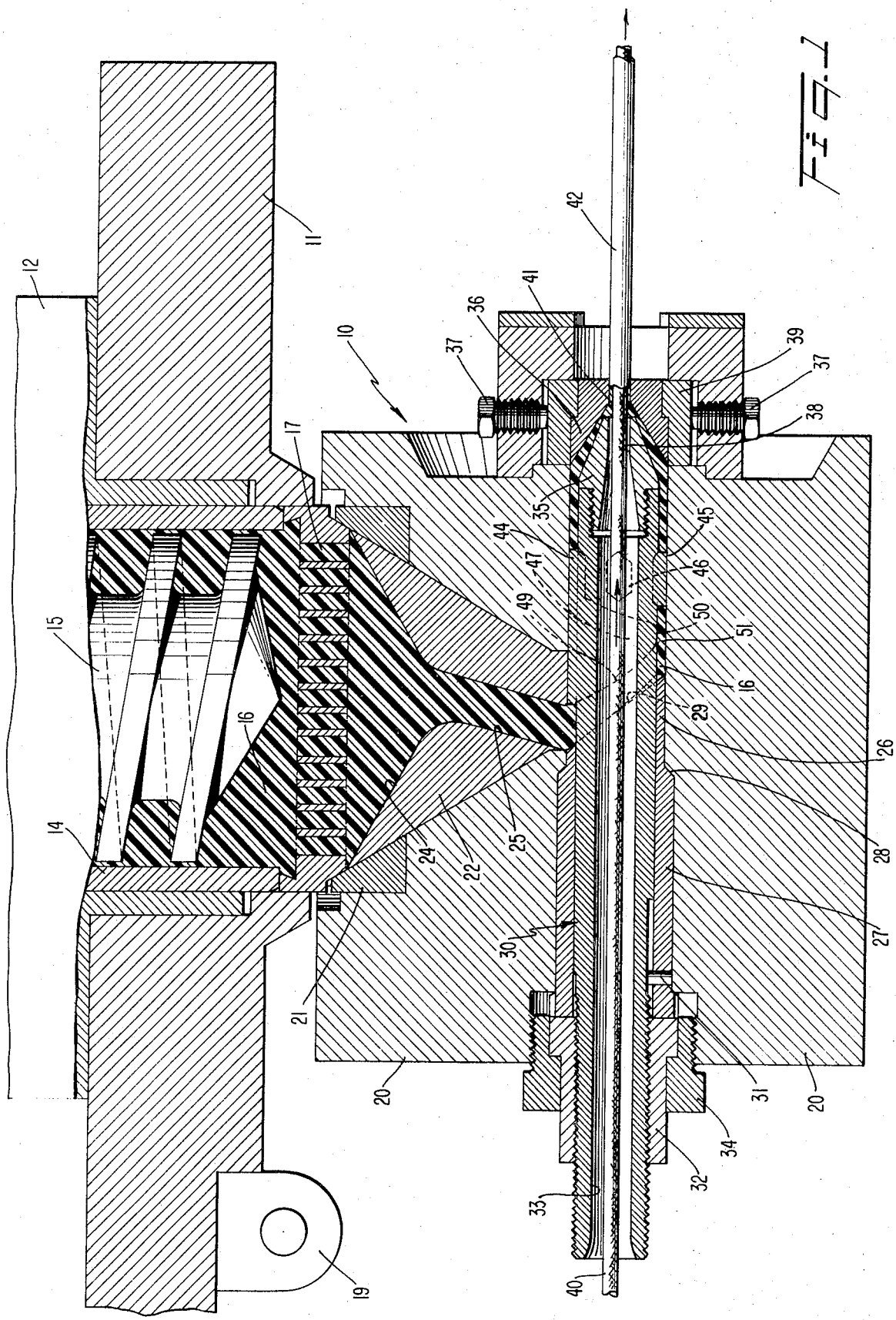
FIG. 1 is a view in horizontal section through the axis of a cable-sheathing crosshead and of the forward, outer end of the barrel of a plastic material extrusion apparatus, certain of the parts being shown in plan.

Turning now to FIG. 1, there is there shown a cable-sheathing crosshead generally designated by the reference character 10. The crosshead 10 is secured to the outer, forward end 12 of the barrel of a screw-type plastic material extruding apparatus by an adapter 11. As shown, a barrel liner 14 disposed within the barrel 12 has a rotating helical stock screw 15 therein, the stock screw being driven in such direction as to urge plastic material 16 under high pressure along the barrel toward the crosshead. Forwardly of the stock screw the plastic material passes through a strainer plate 17 and thence to the main longitudinal bore within the crosshead by way of a velocity block 22 which is in the form of an insert fitting partially within a frusto-conical passage in the body 20 of the crosshead and partially in an annular insert 21 fitting in an annular seat in the body 20 adjacent the strainer plate 17. The crosshead is secured to the adapter 11 by machine screws in a conventional manner, there being a hinge, a part of which is shown at 19, between the adapter 11 and the body 20 of the crosshead, whereby the crosshead remains supported upon the adapter despite its being swung into open position as for cleaning the passages therewithin, removal and cleaning of the strainer plate, etc.

The velocity block 22 has a funnel-shaped entrance end passage 24 of frusto-conical shape therein. An outwardly and rearwardly extending circular cylindrical passage 25 connects the smaller diametered end of the passage 24 to the main, longitudinal bore 26 through the body 20 of the crosshead. The longitudinal axis of the passage through the barrel of the extrusion apparatus and through the longitudinal axis of the stock screw 15, and the longitudinal axes of the passages 24 and 25 lie in the same horizontal plane as that containing the longitudinal axis of the main bore 26 through the body of the crosshead. Accurately fitting within the rear portion of the passage 26 (left, FIG. 1), there is a sleeve 27 having its right-hand surface 29 of the shape shown and described in Van Riper U.S. Pat. No. 2,760,230, that is, in the portion of the surface 29 from a plane through the axis of the passage 26 upwardly in FIG. 1 to the portion of such surface adjacent the smaller end of the passage 25, surface 29 lies in a plane disposed normal to the plane of the paper and extending at 45° with respect to the axis of the passage 26, the remainder of the surface 29 being in the form of two right helicoids which are mirror images of each other, the ends of such right helicoids at the aforementioned normal plane merging smoothly with the 45° plane surfaces which terminate at such normal plane. Sleeve 27 has a forward portion of smaller diameter than the rear portion thereof, the two portions being joined by an annular shoulder 28. Such shoulder accurately locates the sleeve in the bore 26, as well as preventing the rearward flow of plastic material therethrough.

A core guide or guider tube 30 has the rear (left, FIG. 1) end thereof accurately fitting within the sleeve 27, a pin 31 which extends radially through the sleeve 27 having its inner end disposed in a longitudinal groove in the guider tube 30 so as to prevent relative rotation between such two parts. An internally threaded sleeve 32, which is flanged at its inner end, has threaded connection with the externally threaded rear end of the guider tube 30. A retaining nut 34 threadedly mounted in a core in the rear end of the body 20 of the crosshead has a radially inwardly extending flange which overlies the flange on the sleeve 32. Such construction permits the longitudinal adjustment of the tube 30 relative to the sleeve 27 and the extrusion die 36.

The guider tube 30 has a central bore 33 therethrough which is coaxial of the outer main surface of the guider tube. The guider tube tip 35 is screwed into a counterbore at the forward end of the guider tube, the tip 35 having a central passage 38 therethrough which serves accurately to guide a core or bare cable 40 passing forwardly therethrough on its way to the extrusion die 36. The die 36 is retained within an annular die holder 39, the die holder being mounted for limited adjustment in a plane transverse to the axis of the passage 38 through the guider tube tip by means of opposed pairs of set screws 37 (one pair shown), the two pairs being disposed on diameters positioned at 90° with respect to each other. The cable core 40 travels through the guider tube and the guider tip, in its passage between the forward end of the guider tip and the rear end of the die from which it is spaced being completely covered by an annular sheath 41 so that the core and the sheath emerge together from the die in the form of a sheathed cable 42.

The novel construction of the guider tube 30 and its manner of cooperation with the main passage 26 through the crosshead will be more clearly understood upon consideration of FIGS. 2–5, inclusive. As is shown in FIGS. 3, 4, and 5, the various lands on the guider tube 30 all have a radius R, which is the same as that of the main passage 26 through the crosshead except for manufacturing and assembly tolerances, so that the guider tube is accurately received within such main passage. The other outer surfaces of the guider tube 30, between the various lands and forwardly and rearwardly thereof all have a uniform radius r, so that there are formed part-annular passages between the surface of the main passage 26 and the root surfaces of the guider tube 30 rearwardly of, between, and forwardly of the various lands, now to be described. The guider tube has a main, upper (FIG. 2) land 44 thereon which is symmetrical with respect to an axial longitudinal plane lying in the plane of the paper of FIG. 1. In the lower part of the guider tube as it is shown in FIGS. 1 and 2, there is disposed a laterally symmetrical longitudinally extending land 45 lying opposite land 44. Centrally between the forward portions of the upper land 44 and of the bottom land 45 there are symmetrically disposed two identical short longitudinally extending lands 46.

Land 44

At its entering, left-hand end the land 44 is generally of saddle shape, each half of such saddle being designated 47. The upper central edge of land 44, at the zone of junction of the upper ends of the two saddle halves 47, is disposed spaced from the upper (FIG. 1) part of the end surface 29 of sleeve 27, the upper end surface of the land 47 being spaced from surface 29 in such location through a distance which substantially equals the diameter of the passage 25 in the velocity block 22. Each of the saddle halves 47 has a rounded lower end 50, ends 50 being spaced from each other as shown in FIG. 3. There is thus provided a part-annular passage 51 at the zone of the passage 26 through the crosshead which lies furthest from the outer forward end of the plastic material delivering stock screw 15. Plastic material delivered through the passage 25 under high pressure is thus forced to travel downwardly along the edges 49 of the saddle portions 47 of the land 44; such edges 49 are of such shape that its geometrical elements all lie radially of the longitudinal axis of the guider tube 30 and radially of its root surface 52.

After travelling through the passage 51, formed by the surfaces 50, 50, 52, and 26, the plastic material passes into two symmetrically disposed opposite part-annular passages 57 (FIG. 4) formed between the respective opposite edges 56 of the intermediate longitudinal portion 55 of the land 44, the passage 26, and the opposite edges 74 of the rear end portion 43 of the bottom land 45. The rear edge surfaces 54 of the saddle halves 47 have geometrical elements which lie radially of the longitudinal axis of the guider tube 30. At their upper ends the surfaces 54 meet at 53 the rear ends of longitudinally extending surfaces 56 which likewise have their geometrical elements extending radially of the longitudinal axis of the guider tube 30. From the forward ends 59 of the surfaces 56 the land 44 has oppositely inclined symmetrically disposed edges 60 which are inclined forwardly to junctions 61. The forward, narrower portion 62 of the land 44 has edges 64 which extend forwardly from junctions 61 parallel to the axis of the tube 30 until they reach the forward edges 65. From edges 65 the portion 62 of land 44 extends forwardly in the shape of a broad V having oppositely symmetrically inclined forward end surfaces 66 which meet in a forward central edge 67. All of the surfaces 60, 64, and 66 have their geometrical elements extending radially of the longitudinal axis of the guider tube 30.

Land 45

Land 45 has a rear central edge 70 which is disposed in the plane of the paper in FIG. 1. From edge 70 the rear portion 43 of the land 45 diverges symmetrically in a forward direction along edges 71 which terminate at rear edges 72. From edges 72 the portion 43 of the land 45 extends forwardly, the land portion 43 being disposed diametrically opposite the upper land portion 55 (FIG. 4) to form oppositely disposed identical part-annular passages 57 (FIG. 4). From the forward edges 75 of the portion 43 of land 45 the land converges symmetrically in a forward direction along edges 76. From the forward ends 77 of the surfaces 76 there extend opposite longitudinally extending surfaces 78 which define the side surfaces of a lower land portion 90 which, as shown in FIG. 5, is the same in angular extent as the upper land portion 62. Portion 90 terminates forwardly in edges 91, the land portion 90 converging symmetrically in opposite directions along surfaces 92 to an edge 93 lying in the plane of the paper of FIG. 1. The geometrical elements of all of the end surfaces of the land 45 lie radially of the main longitudinal axis of the guider tube 30.

Lands 46

The two oppositely disposed lands 46 lie diametrically opposite each other, as shown in FIG. 5, with their central horizontal longitudinal plane lying at 90° with respect to the central vertical longitudinal plane through the land portions 62, 90. Each of the lands 46 has a rear, central edge 79 from which surfaces 80 diverge symmetrically in a forward direction to corners 81. From corners 81 the lands 46 are bounded by forwardly extending longitudinal edges 82 which terminate in forward corners 84. From the corners 84 the lands 46 converge forwardly in a symmetrical manner along surfaces 85 which meet in a central forward edge 86. All of the surfaces 80, 82, and 85 have the geometrical elements thereof extending radially of the longitudinal main axis of the guider tube 30. As shown in FIG. 5 there are thus presented four equally angularly spaced part-annular passages 87 between successive land portions (reading clockwise from the top in FIG. 5) 62, 46, 90, and 46. All of the land portions 62, 46, and 90 have their forward edges disposed somewhat rearwardly of the forward end of the guider tube 30. There is thus presented an unbroken annular passage 89 between the smooth circular cylindrical forward end portion of the guider tube 30 and the surface 26 of the main passage through the crosshead immediately to the rear of the guider tube tip 35 and the extrusion die 36.

It will thus be apparent that when delivered to the main passage 26 in the crosshead, the plastic material is at first constrained to pass only through the passage 51 which is on the far side of the guider tube (FIG. 3). After passing beyond the lower ends 50 of the saddles 47, the plastic material is then permitted to flow into two identical oppositely symmetrically disposed channels 57 positioned along opposite sides of the guider tube. Such two channels 57 are then, in effect, each divided into two channels by the lands 46, the plastic material then travelling along the four identical equally angularly spaced passages 87.

It is ordinarily desired that the total corss-sectional area of the four passages 87 shall be no greater than the sum of the cross-sectional area of the two channels 57; such total area of passages 87 is preferably somewhat less than the sum of the areas of passages 57, in order to maintain a back pressure upon the plastic material flowing therethrough. Finally, upon emerging into the unbroken annular passage between the forward smooth portion of the guider tube 30 and the bore 26 in the crosshead, the plastic material is permitted to slow down somewhat. In such zone the conditions of pressure and rate of flow tend to become uniform throughout the entire annular extent of such zone. As above noted, stream-dividing and conrolling means in the chamber are of such configuration and axial length as substantially to remove all components of motion therefrom except that directed in a substantially forward direction. As a result, the extrusion die 36 never need be adjusted with the axis of its die passage very far from concentricity with the passage through the tip of the guider tube in order to produce sheathed cable wherein the sheath is of a uniform wall thickness. Furthermore, once the die has been suitably adjusted, few if any further adjustments of such die need be made over long periods of operation of the apparatus in order to produce sheathed cables with sheath thickness which is uniform within commercially allowable tolerances.

Although the invention is illustrated and described with reference to one embodiment thereof, it is to be expressly understood that it is in no way limited to the disclosure of such a preferred embodiment, but is capable of numerous modifications within the scope of the appended claims.

What is claimed is:

1. Apparatus for sheathing a core with plastic material, said apparatus having mechanism for delivering plastic material under pressure, a crosshead disposed on the mechanism and having an axial bore for receiving and conducting forwardly therealong plastic material from the delivering mechanism, a delivery passage interposed between the delivering mechanism and the bore, a die at the forward end of the bore for shaping the plastic material flowing forwardly in the bore as it passes out of the crosshead, a central tubular member in the bore of the crosshead extending across the open end of the delivery passage toward the die, said tubular member receiving and guiding the core being sheathed by the apparatus, the forward end of said tubular member lying rearwardly of the die, the wall of the bore and the exterior of the central tubular member forming a sleeve-like annular chamber therebetween, means at the end of the chamber rearward of the open end of the delivery passage having a forward plastic material diverting surface facing the die for diverting the plastic material toward the die as the plastic material passes into the rear end of the chamber, means in the chamber for initially diverting the plastic material delivered to the bore from the delivery passage so as to form a single stream of such plastic material in a zone of the chamber disposed remote from the open end of the delivery passage, means in the chamber forwardly of the last-named means for dividing the single stream of plastic material into a first plurality of similar streams spaced symmetrically with respect to the single stream from which they are formed and then dividing each of the streams of said first plurality into a second plurality of similar streams each of which is spaced symmetrically with respect to the single stream of the first plurality from which it is formed, the second plurality of streams being disposed at equal angles about the axis of the central tubular member, the forward end of the last-named means being disposed at a substantial distance rearwardly of the die, the chamber immediately rearwardly of the die being in the form of a complete annular space into which said second plurality of streams of plastic material flow so as to form a sleeve-like sheath of plastic material which flows about the core and travels therewith forwardly through the die so as to form an elongated sheathed product, the said plastic material diverting and dividing means comprising dams interposed in the chamber between the bore and the central tubular member, said dams comprising a first, elongated dam which is symmetrical with respect to a plane containing the longitudinal axis of the central tubular member and the longitudinal axis of the delivery passage, the first dam comprising a first, rear portion which is of saddle shape and having inclined rear edge portions disposed generally parallel to the plastic material diverting surface at the rear end of the chamber, the spaced confronting ends of the saddle-shaped portion defining the sides of the passage which shape and confine the said single stream of plastic material, the first dam having a second, elongated axially extending intermediate portion, and comprising a second dam disposed 180° removed from the intermediate portion of the first dam, the intermediate portion of the first dam, and the second dam being of substantially the same angular extent about the axis of the central tubular member.

2. Core sheathing apparatus as claimed in claim 1, wherein the second dam has a rearwardly facing end of V-shape with the central edge thereof disposed centrally between the free ends of the saddle-shaped first portion of the first dam and somewhat forwardly thereof.

3. Core sheathing apparatus as claimed in claim 2, where the first dam has a third, forward portion and the second dam has a second, forward portion, the third portion of the first dam and the second portion of the second dam being similar and being disposed 180° opposite each other with respect to the longitudinal axis of the central tubular member.

4. Core sheathing apparatus as claimed in claim 3, wherein the second portion of the first dam is joined to the third portion of the first dam by forwardly converging edge portions, and the second portion of the second dam is joined to the first portion thereof by similar forwardly converging portions.

5. Core sheathing apparatus as claimed in claim 4, comprising two further similar dams disposed 180° apart around the axis of the central tubular member and centrally between the respective confronting edges of the third portion of the first dam and the second portion of the second dam.

6. Core sheathing apparatus as claimed in claim 5, wherein the two further dams have rear similar V-shaped ends, the respective sides of such V-shaped ends of the further dams lying generally parallel to the respective inclined edges of the portions of the first dam joining the second and third portions thereof and the portions of the second dam joining the first and second portions thereof.

7. Core sheathing apparatus as claimed in claim 6, wherein the forward ends of the third portion of the first dam, the second portion of the second dam, and of the two further dams are all forwardly facing V-shaped formations, the forward, central edges of each of such V-shaped formations all type substantially in the same plane disposed transverse to the longitudinal axis of the central tubular member.

* * * * *